(12) United States Patent
Hariu et al.

(10) Patent No.: US 8,330,456 B2
(45) Date of Patent: Dec. 11, 2012

(54) ROTATIONAL ANGLE SENSING DEVICE

(75) Inventors: Tetsuo Hariu, Hekinan (JP); Masahiro Makino, Kariya (JP)

(73) Assignee: Denso Corporation, Kariya (JP)

( * ) Notice: Subject to any disclaimer, the term of this patent is extended or adjusted under 35 U.S.C. 154(b) by 256 days.

(21) Appl. No.: 12/898,286

(22) Filed: Oct. 5, 2010

(65) Prior Publication Data

US 2011/0080163 A1   Apr. 7, 2011

(30) Foreign Application Priority Data

Oct. 5, 2009 (JP) ................................. 2009-231382

(51) Int. Cl.
*G01B 7/30* (2006.01)
(52) U.S. Cl. .................. 324/207.25; 324/207.2
(58) Field of Classification Search .............. 324/207.2, 324/207.25
See application file for complete search history.

(56) References Cited

U.S. PATENT DOCUMENTS

| 2003/0020468 A1 | 1/2003 | Kato et al. |
| 2004/0189288 A1 | 9/2004 | Mizutani et al. |
| 2007/0103149 A1 | 5/2007 | Horie et al. |

FOREIGN PATENT DOCUMENTS

| JP | 08-049575 | 2/1996 |
| JP | 2006-271142 | 10/2006 |

OTHER PUBLICATIONS

Japanese Office Action dated Sep. 16, 2011, issued in corresponding Japanese Application No. 2009-231382 with English Translation.
Chinese Office Action dated Mar. 29, 2012, issued in corresponding Chinese Application No. 201010293363.0 with English Translation.

*Primary Examiner* — Reena Aurora

(74) *Attorney, Agent, or Firm* — Nixon & Vanderhye PC

(57) ABSTRACT

First and second magnets are installed to an inner peripheral wall of a yoke, which is configured into a tubular form. The yoke is constructed from at least one plate material. At each contact portion, a corresponding circumferential end part of the at least one plate material and another corresponding circumferential end part of the at least one plate material contact with each other. A Hall IC is placed in a magnetic field, which is generated between the first and second magnets.

3 Claims, 7 Drawing Sheets

ROTATIONAL ANGLE SENSING DEVICE

CROSS REFERENCE TO RELATED APPLICATION

This application is based on and incorporates herein by reference Japanese Patent Application No. 2009-231382 filed on Oct. 5, 2009.

BACKGROUND OF THE INVENTION

1. Field of the Invention

The present invention relates to a rotational angle sensing device.

2. Description of Related Art

In a prior art rotational angle sensing device, which senses a rotational angle of an accelerator pedal, two magnets are opposed to each other about a central axis and are fixed at the accelerator pedal, which is rotatable forward or backward depending on a pedal force applied from a driver of a vehicle to the accelerator pedal. A Hall IC is placed at the central axis such that the two magnets are rotatable relative to the Hall IC. A voltage signal, which is outputted from the Hall IC, is sensed to sense a rotational angle of the accelerator pedal. Japanese Unexamined Patent Publication No. 2007-132819A (corresponding to US2007/0103149A1) teaches such a rotational angle sensing device. Specifically, in the rotational angle sensing device, a cylindrical yoke, which has a circular cross section, is placed radially outward of the magnets to form a magnetic circuit, thereby increasing a density of a magnetic flux between the magnets.

In this type of rotational angle sensing device, volumes of the magnets have a large influence on the manufacturing costs. Therefore, it is conceivable to reduce the volumes of the magnets to reduce the manufacturing costs.

However, when the volumes of the magnets are reduced, a magnetic flux, which is indicated by an arrow $\phi 100$ in FIG. 7, flows between circumferential ends of the magnets 101, 102 and an inner wall of the yoke 103. This may possibly reduce a range of a parallel magnetic field, in which the magnetic flux flows in parallel between the magnets 101, 102. Therefore, when the Hall IC 104 is displaced from the central axis of the yoke 103 due to, for example, presence of a manufacturing tolerance, a voltage signal, which is outputted from the Hall IC 104, may possibly change to reduce a sensing accuracy.

SUMMARY OF THE INVENTION

The present invention is made in view of the above disadvantage. Thus, it is an objective of the present invention to provide a rotational angle sensing device, which provides a wider range of a parallel magnetic field to enable an improvement in a sensing accuracy and a reduction in manufacturing costs.

To achieve the objective of the present invention, there is provided a rotational angle sensing device, which includes a yoke, a first magnet, a second magnet and a magnetic sensing means. The yoke is made of a magnetic material and is configured into a tubular form. The first magnet is installed to a first section of an inner peripheral wall of the yoke. The second magnet is installed a second section of the inner peripheral wall of the yoke to oppose the first magnet in a first direction about a central axis of the yoke. A polarity of a magnetic pole at a radially inner side of the second magnet is opposite from a polarity of a magnetic pole at a radially inner side of the first magnet. A magnetic sensing means is for sensing a magnetic field, which is generated between the first magnet and the second magnet. The magnetic sensing means is placed in the magnetic field and outputs an electrical signal that corresponds to a direction of the magnetic field, which changes when a relative rotation occurs between the magnetic sensing means and the first and second magnets. The yoke is constructed from at least one plate material, which is processed to have the tubular form. At least one contact portion is placed radially outward of at least one of the first magnet and the second magnet. At each of the at least one contact portion, a corresponding circumferential end part of the at least one plate material and another corresponding circumferential end part of the at least one plate material contact with each other. The yoke has a first inner diameter that is measured in the first direction. The yoke has a second inner diameter that is measured in a second direction, which is perpendicular to both of the first direction and the central axis of the yoke. The second inner diameter of the yoke is larger than the first inner diameter of the yoke.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference, to the accompanying drawings.

First Embodiment

A rotational angle sensing device, which is applied to an accelerator pedal module, according to a first embodiment of the present invention will be described. The accelerator pedal module senses an amount of depression of an accelerator pedal and outputs the sensed amount of depression of the accelerator pedal as a voltage signal, which indicates a rotational angle of the accelerator pedal. An engine control unit (EDU) controls an operational state of an internal combustion engine based on this voltage signal.

Figure 2:
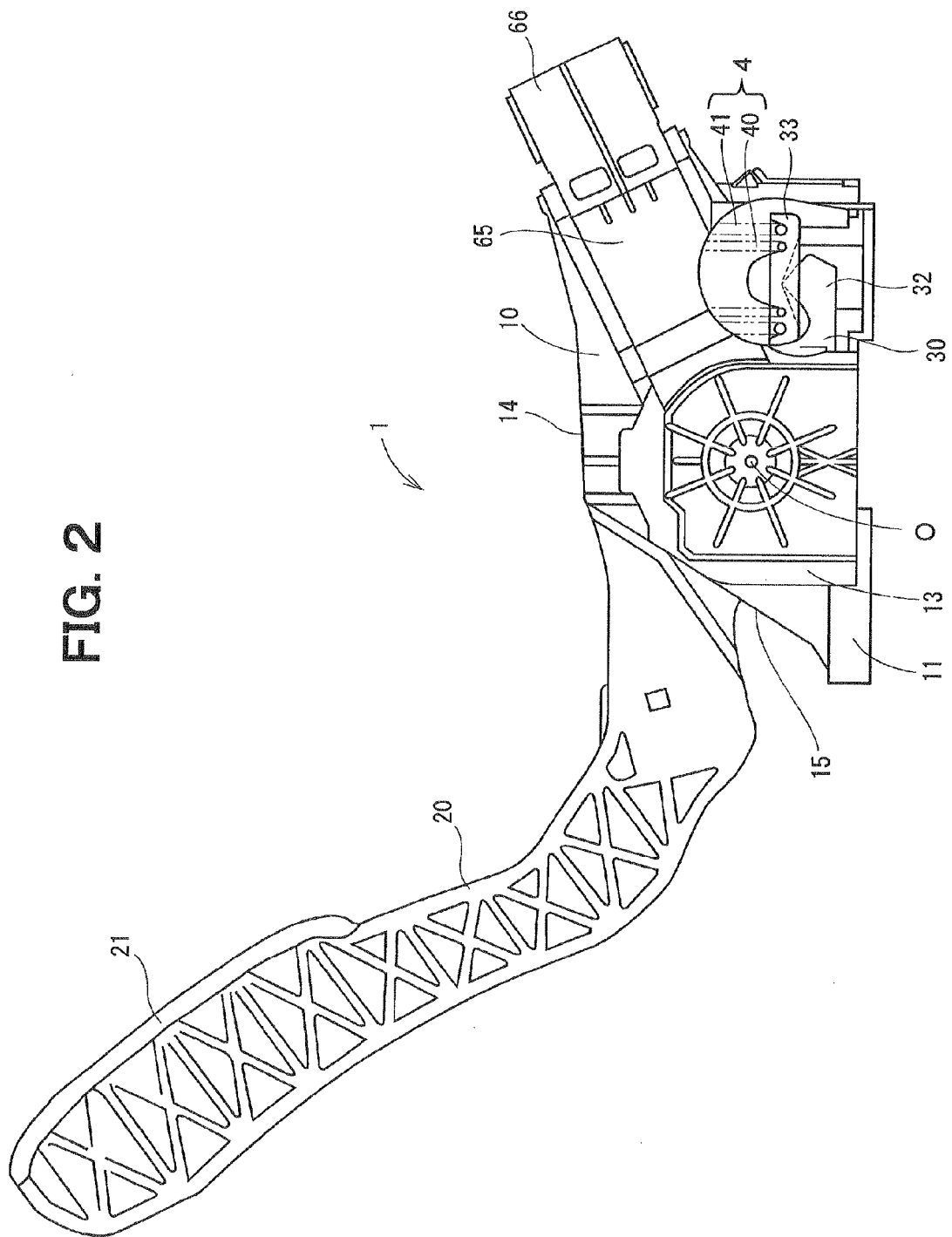
FIG. 2 is a side view showing an accelerator pedal module, in which the rotational angle sensing device of the first embodiment is applied.
Figure 3:
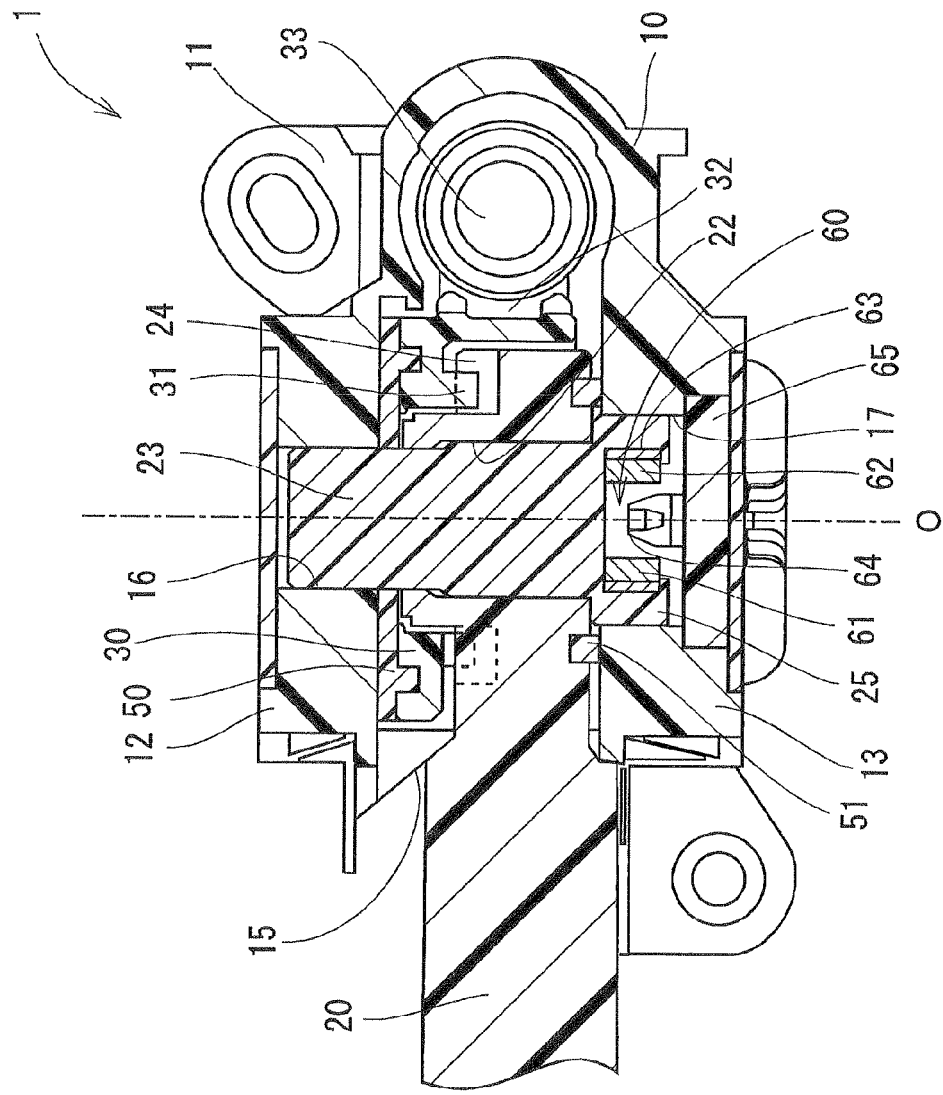
FIG. 3 is a partial cross-sectional view showing the accelerator pedal module, in which the rotational angle sensing device of the first embodiment is applied.

First of all, a structure of the accelerator pedal module will be described with reference to FIGS. 2 and 3. The accelerator pedal module 1 includes a housing 10, the accelerator pedal 20, a pedal rotor 30, a double coil spring 4, a friction washer 50 and the rotational angle sensing device 60.

The housing 10 includes a bottom plate 11, side plates 12, 13 and a top plate 14, which are formed integrally. The bottom plate 11 is installable to a vehicle body. The side plates 12, 13 extend from left and right ends, respectively, of the bottom plate 11 in a direction generally perpendicular to the bottom plate 11. The top plate 14 is placed at top ends of the side plates 12, 13.

The accelerator pedal 20 has an operating portion (pedal plate) 21 at one end part of the accelerator pedal 20. The other end part of the accelerator pedal 20 is inserted into an interior of the housing 10 through an opening 15, which is formed between the side plates 12, 13. A shaft hole 22 is formed at the other end part of the accelerator pedal 20, and a generally cylindrical shaft member 23 is inserted into and is fixed in the shaft hole 22. The shaft member 23 is rotatably supported by bearing portions 16, 17, which are provided to the left and right side plates 12, 13, respectively. In this way, the accelerator pedal 20 is rotatable about a central axis O.

The pedal rotor 30 is placed at one axial side of the accelerator pedal 20 in the direction of the central axis O. Bevel teeth 24 are provided at a pedal rotor 30 side outer wall of the accelerator pedal 20. Bevel teeth 31 are provided to an accelerator pedal 20 side outer wall of the pedal rotor 30. The accelerator pedal 20 and the pedal rotor 30 are rotated together through engagement between the bevel teeth 24 and the bevel teeth 31.

A spring holder 33, which is configured into a dish shape, is placed on a support section 32 that is placed radially outward of the pedal rotor 30. The double coil spring 4 includes an inner coil spring 40 and an outer coil spring 41, which are placed one after another in a radial direction. The coil springs 40, 41 are engaged to the spring holder 33 at one ends thereof and are also engaged to an inner wall of the top plate 14 at the other ends thereof. The coil springs 40, 41 apply a resilient force, which corresponds to the rotational angle of the accelerator pedal 20, to the pedal rotor 30 through the spring holder 33.

The friction washer 50 is placed between the pedal rotor 30 and the side plate 12, and a friction ring 51 is placed between the accelerator pedal 20 and the side plate 13. When the driver applies the pedal force on the operating portion 21, a thrust force, which urges the accelerator pedal 20 and the pedal rotor 30 away from each other in the direction of the central axis O, is exerted at the bevel teeth 24, 31 in response to the pedal force and the resilient force of the coil springs 40, 41. Therefore, in response to the rotational angle of the accelerator pedal 20, a frictional force is generated between the friction washer 50 and the side plate 12, and a frictional force is also generated between the friction ring 51 and the side plate 13. These frictional forces act as resistance forces, which resist the rotation of the accelerator pedal 20 and apply predetermined hysteresis to the rotation of the accelerator pedal 20.

The rotational angle sensing device 60 includes a first magnet (first permanent magnet) 61, a second magnet (second permanent magnet) 62, a yoke 63 and a Hall IC (serving as a magnetic sensing means) 64.

The first magnet 61, the second magnet 62 and the yoke 63 are resin molded at an end part 25 of the shaft member 23. The Hall IC 64 is a magnetic sensor, in which two Hall elements and a signal amplifier circuit are integrated. The Hall IC 64 outputs a voltage signal (electrical signal), which corresponds to a density of a magnetic flux that passes through the Hall elements. The voltage signal, which is outputted from the Hall IC 64, is transmitted to an electronic control unit (ECU) of the vehicle through a sensor holder 65 and a connector 66.

Figure 1:
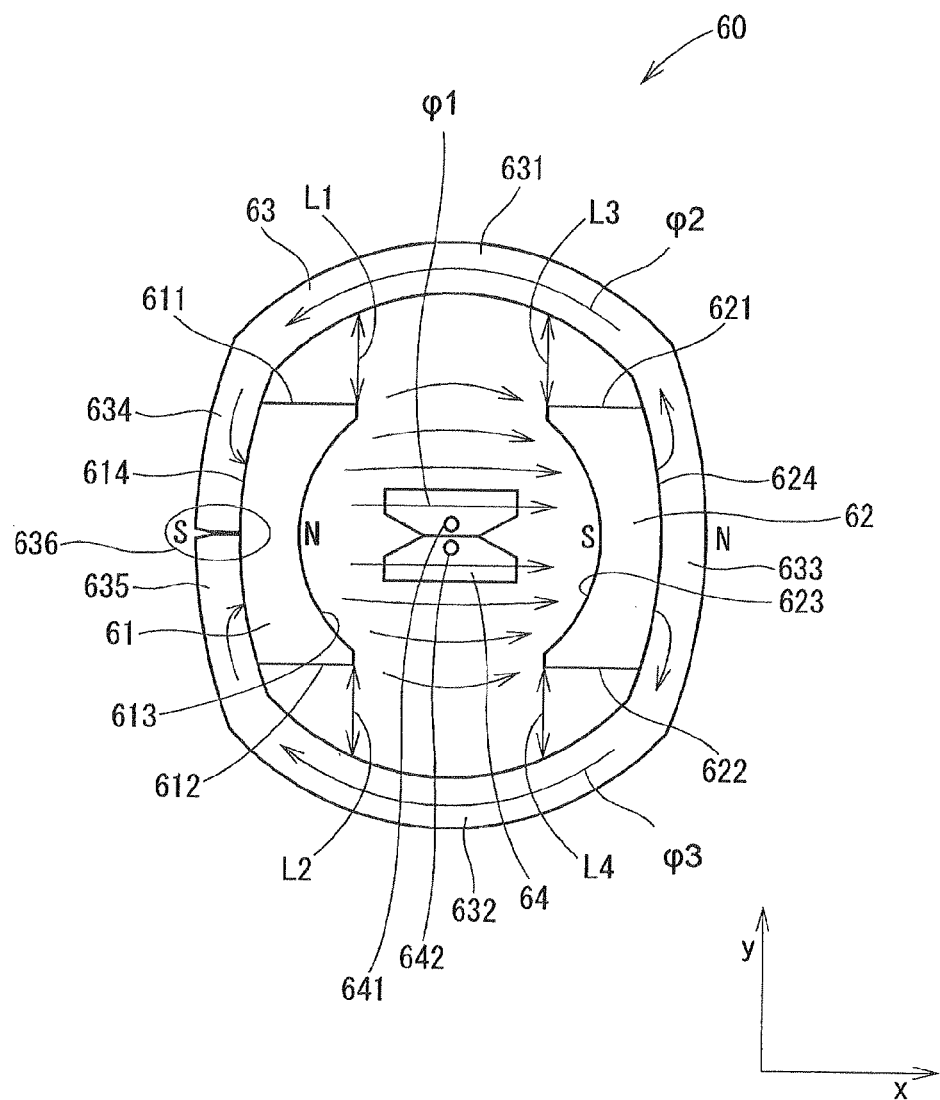
FIG. 1 is a plan view showing a rotational angle sensing device according to a first embodiment of the present invention.

Next, the rotational angle sensing device 60 will be described in detail with reference to FIG. 1. In FIG. 1, the left-to-right direction is denoted as an X-direction (first direction), and the top-to-bottom direction is denoted as a Y-direction (second direction).

The yoke 63 is configured into a tubular form by bending a plate (plate material), which is made of a magnetic material (e.g., iron). The yoke 63 has a top wall 631, a bottom wall 632, a right wall 633 and first and second left walls 634, 635. The top wall 631 is placed at the top side in the Y-direction. The bottom wall 632 is placed at the bottom side in the Y-direction. The right wall 633 is placed at the right side in the X-direction. The first and second left walls 634, 635 are placed at the left side in the X-direction. A circumferential end part of the first left wall 634 and a circumferential end part of the second left wail 635 contact with each other at a location, which is located on the left side of the central axis O (see FIG. 2) in the X-direction. The portion, at which the circumferential end parts of the plate of the yoke contact with each other, will be hereinafter referred to as a contact portion 636.

The terms of the top side, the bottom side, the right side, the left side, the top wall, the bottom wall, the right wall and the left wall(s) are used only for the descriptive purpose for describing the rotational angle sensing device 60 placed in the state shown in FIG. 1 and are not intended to indicate the absolute positional relationship of the parts of the rotational angle sensing device 60 upon application of the rotational angle sensing device 60 to the accelerator pedal module.

The right wall 633, the first left wall 634 and the second left wall 635 are arcuately configured and have a corresponding radius of curvature. Also, the top wall 631 and the bottom wall 632 are arcuately configured and have a corresponding radius of curvature, which is different from the radius of curvature of the right wall 633, the first left wall 634 and the second left wall 635. The radius of curvature of the right wall 633, the first left wall 634 and the second left wall 635 is larger than the radius of curvature of the top wall 631 and the bottom wall 632. Therefore, a distance between an inner wall surface of the top wall 631 and an inner wall surface of the bottom wall 632, which is measured along a corresponding line passing through the central axis, is larger than a distance between an inner surface of the first and second left walls 634, 635 and an inner surface of the right wall 633, which is measured along a corresponding line passing through the central axis. Thus, the yoke 63 is configured such that the radius of curvature of the inner wall surfaces, which are opposed to each other in the X-direction, is larger than the radius of curvature of the inner wall surfaces, which are opposed to each other in the Y-direction. The diameter of the yoke 63, which is measured in the Y-direction along the corresponding line passing through the central axis, is larger than the diameter of the yoke 63, which is measured in the X-direction along the corresponding line passing through the central axis.

The first magnet 61 is fixed to the inner wall surface of the first and second left walls 634, 635, and the second magnet 62 is fixed to the inner wall surface of the right wall 633. The first magnet 61 is magnetized to have an N-pole on a central axis side surface (radially inner side) of the first magnet 61. The second magnet 62 is magnetized to have an S-pole on a central axis side surface (radially inner side) of the second magnet 62. The first and second magnets 61, 62 are magnetized in a direction parallel to the X-direction. A magnetic flux flows between the first magnet 61 and the second magnet 62 as indicated by an arrow φ1 in FIG. 1.

Y-direction side outer walls (planar walls) 611, 612 of the first magnet 61, which are opposed to each other in the Y-direction, are generally perpendicular to the Y-direction. Also, Y-direction side outer walls (planar walls) 621, 622 of the second magnet 62, which are opposed to each other in the Y-direction, are generally perpendicular to the Y-direction. A central axis side wall surface 613 of the first magnet 61 and a central axis side wall surface 623 of the second magnet 62 are spaced from the Hall IC 64 by a predetermined distance and are arcuately curved about the central axis.

A yoke 63 side outer wall 614 of the first magnet 61 is configured into an arcuate form having a radius of curvature, which corresponds to that of the first and second left walls 634, 635, and contacts the inner wall surface of the first and second left walls 634, 635 (first section of the inner peripheral wall of the yoke). Similarly, a yoke 63 side outer wall 624 of the second magnet 62 is configured into an arcuate form having a radius of curvature, which corresponds to that of the right wall 633, and contacts the inner wall surface of the right wall 633 (second section of the inner peripheral wall of the yoke).

Preferably, the radius of curvature of the yoke 63 side outer wall 614 of the first magnet 61 is larger than that of the first and second left walls 634, 635. Furthermore, preferably, the radius of curvature of the yoke 63 side outer wall 624 of the second magnet 62 is larger than that of the right wall 633. These settings are also preferred in each of the following embodiments too. With this construction, the end part of the first magnet 61 in the Y-direction and the end part of the second magnet 62 in the Y-direction always contact the inner wall of the yoke 63 at the radially outer side thereof, so that the stable flow of the magnetic flux can be implemented.

The first magnet 61, the second magnet 62 and the yoke 63 form a magnetic circuit. As indicated by an arrow $\phi 2$, the magnetic flux flows through the first magnet 61, the second magnet 62, the right wall 633, the top wall 631 and the first left wall 634 in this order. Also, as indicated by an arrow $\phi 3$, the magnetic flux flows through the first magnet 61, the second magnet 62, the right wall 633, the bottom wall 632 and the second left wall 635 in this order. Therefore, the density of the magnetic flux, which flows between the first magnet 61 and the second magnet 62, is increased.

The Hall IC 64 is placed along the central axis of the yoke 63 and is rotatable relative to the first and second magnets 62. When the yoke 63 and the first and second magnets 61, 62 are rotated relative to the Hall IC 64, the direction of the magnetic field between the first magnet 61 and the second magnet 62 relative to the Hall IC 64 changes. Therefore, the density of the magnetic flux, which passes through magnetic sensing surfaces of the Hall elements 641, 642 molded in the Hall IC 64, changes. Thereby, the Hall IC 64 outputs the rotational angle of the yoke 63 and the first and second magnets 61, 62 relative to the Hall IC 64, as the voltage signal.

Figure 4:
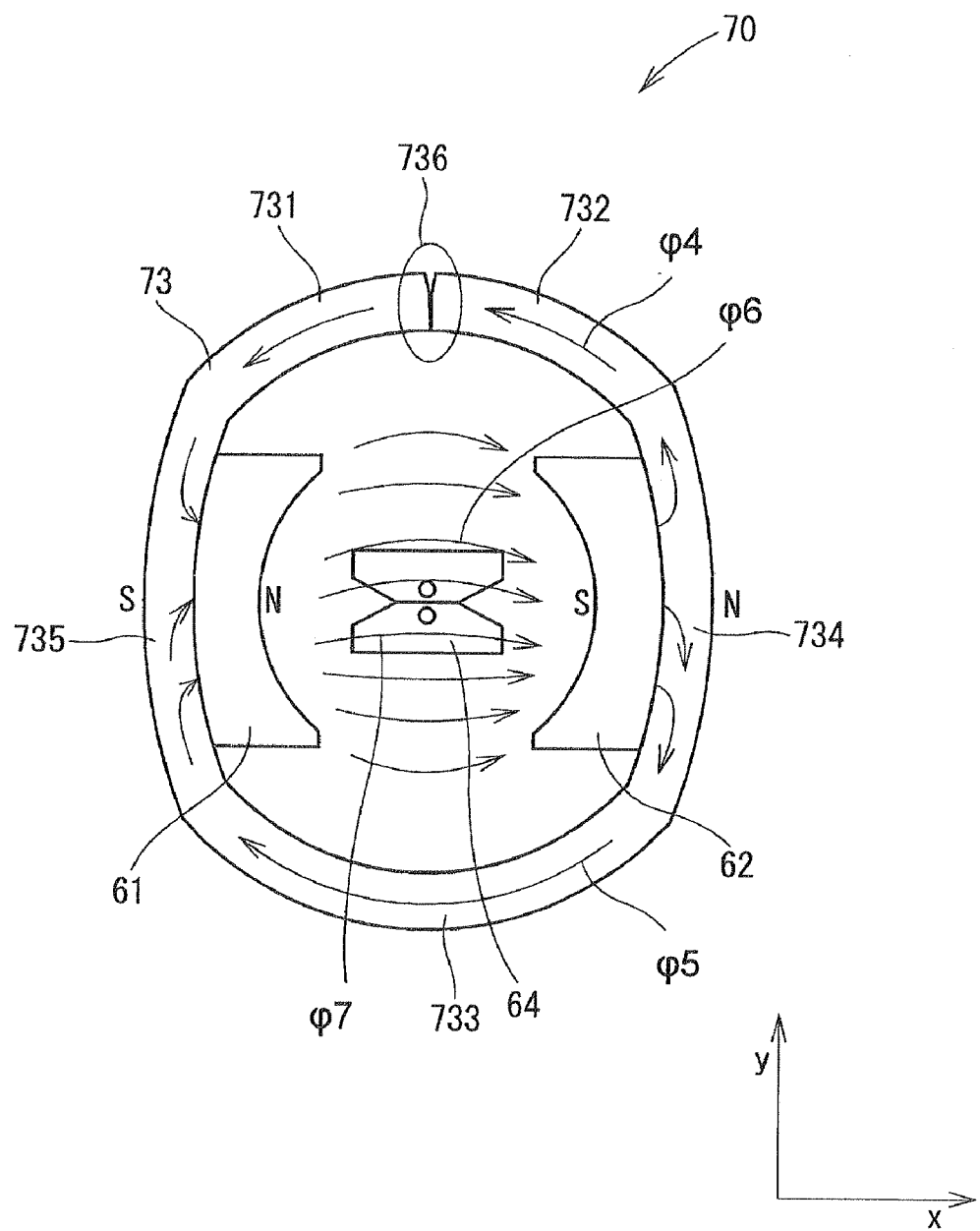
FIG. 4 is a plan view showing a rotational angle sensing device of a comparative example.

Next, FIG. 4 shows a rotational angle sensing device of a comparative example. In the following description, components, which are similar to those of the first embodiment, will be indicated by the same reference numerals and will not be described further.

In the rotational angle sensing device 70 of the comparative example, the contact portion 736 of the yoke 73 is located at the top side of the yoke 73 in the Y-direction.

The yoke 73 has a first top wall 731, a second top wall 732, a bottom wall 733, a right wall 734 and a left wall 735. The first and second top walls 731, 732 are placed at the top side in the Y-direction. The bottom wall 733 is placed at the bottom side in the Y-direction. The right wall 734 is placed at the right side in the X-direction. The left wall 735 is placed at the left side in the X-direction.

A circumferential end part of the first top wall 731 and a circumferential end part of the second top wall 732 contact with each other to form the contact portion 736 at the top side of the central axis in the Y-direction. The magnetic flux does not easily flow through the contact portion 736. Therefore, the amount of the magnetic flux, which is indicated by an arrow $\phi 5$ and flows through the first magnet 61, the second magnet 62, the right wall 734, the bottom wall 733 and the left wall 735, is larger than the amount of the magnetic flux, which is indicated by an arrow $\phi 4$ and flows through the first magnet 61, the second magnet 62, the right wall 734, the second top wall 732, the first top wall 731 and the left wall 735. In this way, as indicated by an arrow $\phi 6$, the density of the magnetic flux between the first magnet 61 and the second magnet 62 at the top side of the central axis where the first and second top walls 731, 732 are located is reduced. Therefore, as indicated by an arrow $\phi 7$, the density of the magnetic flux between the first magnet 61 and the second magnet 62 at the bottom side of the central axis where the bottom wall 733 is located is increased. Therefore, the balance of the magnetic field between the first magnet 61 and the second magnet 62 is deteriorated, and thereby the formation of the parallel magnetic field becomes difficult.

In the first embodiment, the contact portion 636 is located along the line passing through the central axis in the X-direction (the contact portion 636 being placed adjacent to the center of the first magnet 61 that is centered in the Y-direction), and the first and second left walls 634, 635 contact the outer wall 614 of the first magnet 61. Thereby, the amount of the magnetic flux, which is indicated by the arrow $\phi 2$ and flows through the first magnet 61, the second magnet 62, the right wall 633, the top wall 631 and the first left wall 634 in this order, becomes generally the same as the amount of the magnetic flux, which is indicated by the arrow $\phi 3$ and flows through the first magnet 61, the second magnet 62, the right wall 633, the bottom wall 632 and the second left wall 635 in this order. Therefore, as indicated by the arrow $\phi 1$, the balance of the magnetic field between the first magnet 61 and the second magnet 62 is maintained, and thereby the parallel magnetic field can be formed in the wide range.

In the first embodiment, the diameter of the yoke 63, which is measured in the Y-direction along the corresponding line passing through the central axis, is larger than the diameter of the yoke 63, which is measured in the X-direction along the corresponding line passing through the central axis. The Y-direction side outer walls 611, 612 of the first magnet 61, which are opposed to each other in the Y-direction, and the Y-direction side outer walls 621, 622 of the second magnet 62, which are opposed to each other in the Y-direction, are generally perpendicular to the Y-direction. Therefore, the inner end of the Y-direction side outer wall 611 of the first magnet 61 and the inner end of the Y-direction side outer wall 621 of the second magnet 62, which are opposed to each other in the X-direction, can be further spaced from the inner wall of the yoke 63 in the Y-direction by the distance L1, L3. Also, the inner end of the Y-direction side outer wall 612 of the first magnet 61 and the inner end of the Y-direction side outer wall 622 of the second magnet 62, which are opposed to each other in the X-direction, can be further spaced from the inner wall of the yoke 63 in the Y-direction by the distance L2, L4. Thereby, the leakage of the magnetic flux from the inner ends of the Y-direction side outer walls 611, 612, 621, 622 of the first and second magnets 61, 62 to the yoke 63 in the Y-direction can be reduced. Thus, the amount of the magnetic flux, which flows between the magnetic pole of the first magnet 61 and the magnetic pole of the second magnet 62 opposed to each other, can be increased. In this way, even in the case of the magnets having the small volume, the parallel magnetic field can be obtained in the wide range, as indicated by the arrow $\phi 1$. Thus, in the case where the Hall IC 64 is displaced from the central axis due to the manufacturing tolerance, it is possible to limit the change in the voltage signal caused by a deviation of the location of the Hall IC 64 relative to the translation (parallel magnetic flux flow) of the magnetic circuit, so that the sensing accuracy can be improved.

Furthermore, the Y-direction side outer walls 611, 612, 621, 622 of the first and second magnets 61, 62 are generally perpendicular to the Y-direction. Thereby, the size of each of the first and second magnets 61, 62 is reduced. Thus, the number of the magnets, which are produced from the parent material of the rectangular magnets, can be increased at the time of manufacturing the first and second magnets 61, 62. As a result, the manufacturing costs of the first and second magnets 61, 62 can be reduced.

Second Embodiment

Figure 5:
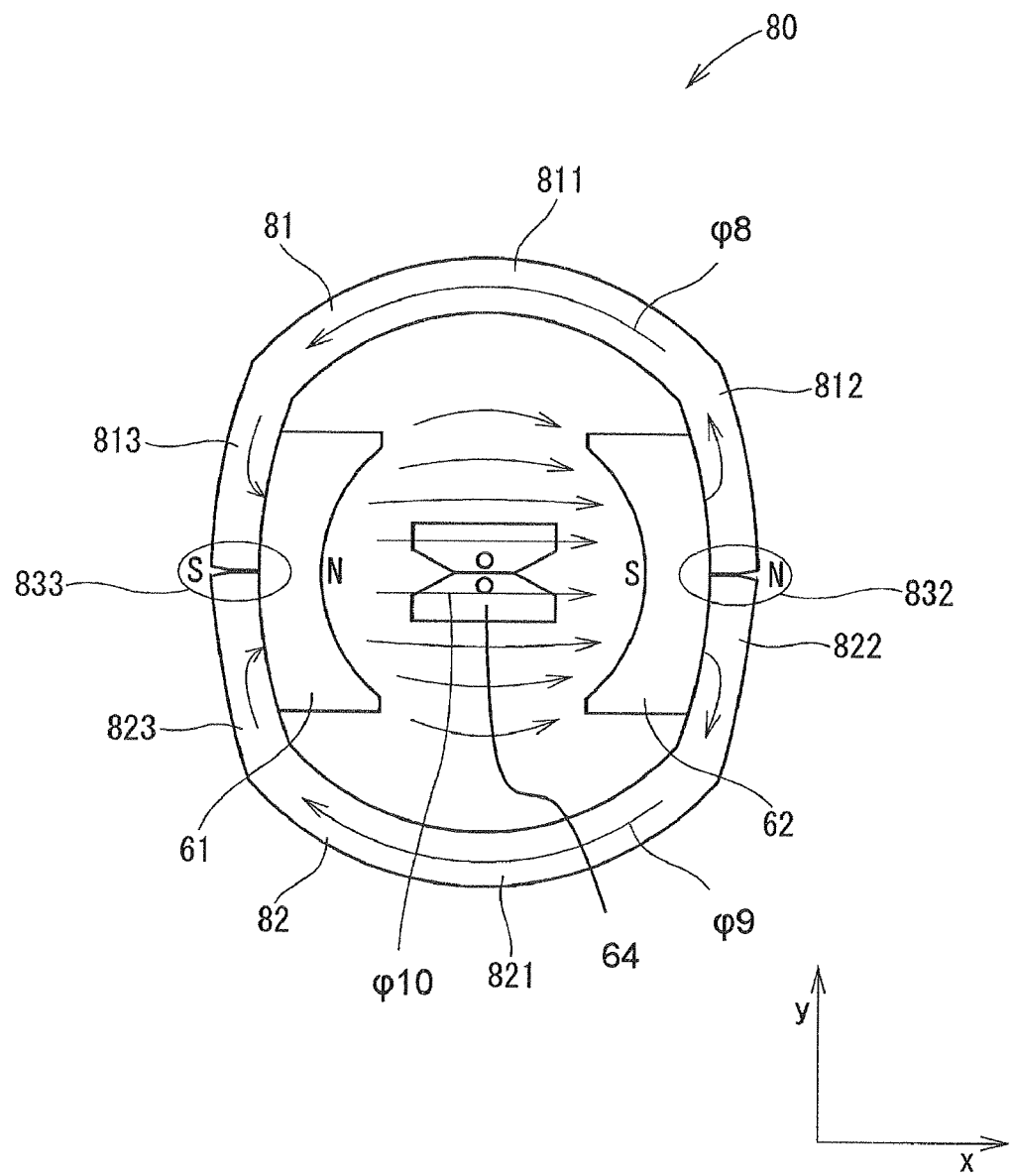
FIG. 5 is a plan view of a rotational angle sensing device according to a second embodiment of the present invention.

FIG. 5 shows a rotational angle sensing device 80 according to a second embodiment of the present invention. In the present embodiment, yokes (more specifically, yoke segments of a yoke configured into the tubular form) 81, 82 are constructed from two plates (plate materials) made of the magnetic material.

The top yoke (top yoke segment of the yoke) 81 includes a top wall 811, a first right wall 812 and a first left wall 813. The top wall 811 is placed at the top side in the Y-direction. The first right wall 812 is placed at the right side in the X-direction. The first left wall 813 is placed at the left side in the X-direction.

The bottom yoke (bottom yoke segment of the yoke) 82 includes a bottom wall 821, a second right wall 822 and a second left wall 823. The bottom wall 821 is placed at the bottom side in the Y-direction. The second right wall 822 is placed at the right side in the X-direction. The second left wall 823 is placed at the left side in the X-direction.

A circumferential end part of the first right wall 812 and a circumferential end part of the second right wall 822 contact with each other and form a contact portion 832 on the right side of the central axis in the X-direction. Furthermore, a circumferential end part of the first left wall 813 and a circumferential end part of the second left wall 823 contact with each other and from a contact portion 833 on the left side of the central axis in the X-direction.

In the second embodiment, the yokes 81, 82 are constructed from the two plates (plate materials) made of the magnetic material. Therefore, each yoke (yoke segments) 81, 82 can be easily processed.

In the second embodiment, each of the contact portions 832, 833 is placed adjacent to the center of the corresponding one of the first and second magnets 61, 62, which is centered in the Y-direction. Therefore, the amount of the magnetic flux, which is indicated by an arrow $\phi 8$ and flows through the magnetic circuit made of the first magnet 61, the second magnet 62, the first right wall 812, the top wall 811 and the first left wall 813, becomes substantially the same as the amount of the magnetic flux, which is indicated by $\phi 9$ and flows through the magnetic circuit made of the first magnet 61, the second magnet 62, the second right wall 822, the bottom wall 821 and the second left wall 823. Therefore, as indicated by the arrow $\phi 10$, the balance of the magnetic flux flowing between the first magnet 61 and the second magnet 62 is maintained, and thereby the parallel magnetic field can be formed in the wide range.

Third Embodiment

Figure 6:
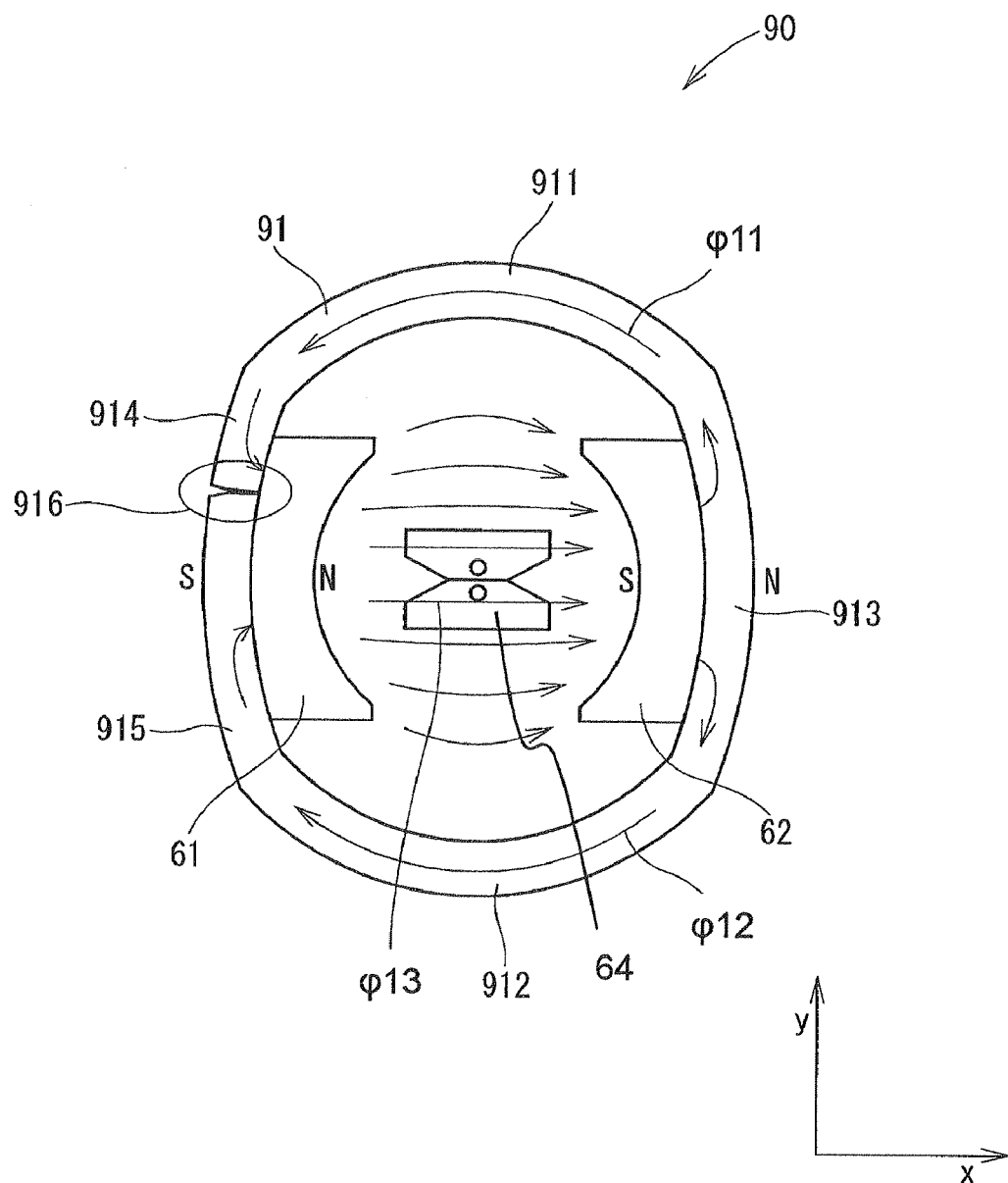
FIG. 6 is a plan view showing a rotational angle sensing device according to a third embodiment of the present invention.
Figure 7:
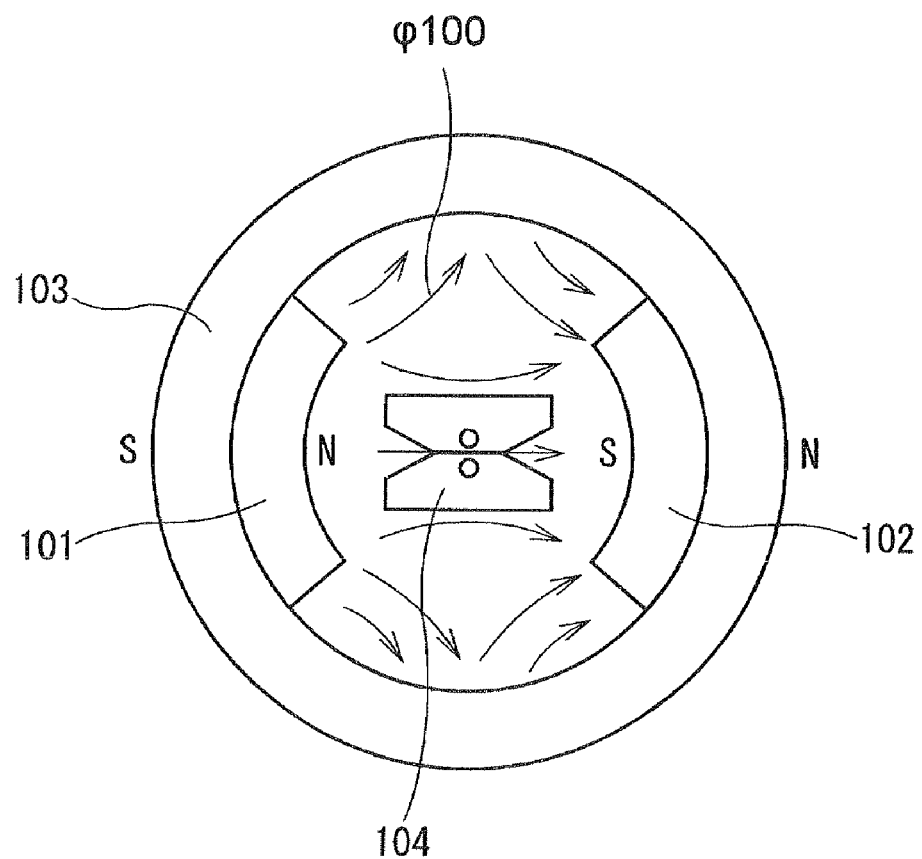
FIG. 7 is a plan view showing a prior art rotational angle sensing device.

FIG. 6 shows a rotational angle sensing device 90 according to a third embodiment of the present invention. In the present embodiment, a yoke 91 is constructed from a single plate (plate material) made of the magnetic material.

The yoke 91 has a top wall 911, a bottom wall 912, a right wall 913 and first and second left walls 914, 915. The top wall 911 is placed at the top side in the Y-direction. The bottom wall 912 is placed at the bottom side in the Y-direction. The right wall 913 is placed at the right side in the X-direction. The first and second left walls 914, 915 are placed at the left side in the X-direction. A circumferential end part of the first left wall 914 and a circumferential end part of the second left wall 915 contact with each other and form a contact portion 916. The contact portion 916 is placed outward of the first magnet 61 in the radial direction of the yoke 91.

As indicated by an arrow $\phi 11$, the magnetic flux flows through the magnetic circuit, which is made of the first magnet 61, the second magnet 62, the right wall 913, the top wall 911 and the first left wall 914. Also, as indicated by an arrow $\phi 12$, the magnetic flux flows through the magnetic circuit, which is made of the first magnet 61, the second magnet 62, the right wall 913, the bottom wall 912 and the second left wall 915.

In the present embodiment, the circumferential end part of the first left wall 914 and the circumferential end part of the second left wall 915 form the contact portion 916. The contact portion 916 contacts the yoke 91 side outer wall of the first magnet 61. Therefore, as indicated by an arrow $\phi 13$, the balance of the magnetic flux, which flows between the first magnet 61 and the second magnet 62, is maintained, and thereby the parallel magnetic field can be formed in the wide range.

Furthermore, in the present embodiment, the yoke is constructed from the single plate. Therefore, it is possible to reduce the number of the components. Thereby, at the time of resin molding the yoke 91 and the first and second magnets 61, 62 at the end part 25 of the shaft member 23, the yoke 91 can be easily positioned relative to the shaft member 23. Therefore, the easiness of the manufacturing is improved, and the manufacturing costs can be reduced.

Now, modifications of the above embodiments will be described.

In the above embodiments, the cross-sectional area of the yoke is configured into a generally ellipsoidal shape. Alternatively, the yoke of the present invention may have a linear section(s) in a portion(s) of the cross-sectional area of the yoke, or the cross-sectional area of the yoke may have a polygonal shape.

In the above embodiments, the Hall IC is described as the example of the magnetic sensing means (magnetic sensor). Alternatively, the magnetic sensing means of present invention may be a magnetic sensor, such as a magneto-resistive (MR) element.

In the above embodiments, the rotational angle sensing device applied to the accelerator pedal module has been described. Alternatively, the rotational angle sensing device of the present invention may be applied to various modules, which sense the rotational angle between the rotatable body and the non-rotatable body (stationary body).

As discussed above, the present invention is not limited the above embodiments and modifications thereof. That is, the above embodiments and modifications thereof may be modified in various ways without departing from the sprit and scope of the invention.

What is claimed is:
1. A rotational angle sensing device comprising:
a yoke made of a magnetic material and configured into a tubular form;

a first magnet installed to a first section of an inner peripheral wall of the yoke;

a second magnet installed to a second section of the inner peripheral wall of the yoke to oppose the first magnet in a first direction across a central axis of the yoke, said first direction being perpendicular to said central axis, wherein a polarity of a magnetic pole at a radially inner side of the second magnet is opposite from a polarity of a magnetic pole at a radially inner side of the first magnet; and a magnetic sensor configured to sense a magnetic field that is generated between the first magnet and the second magnet, wherein:

the magnetic sensor is placed in the magnetic field and outputs an electrical signal that corresponds to a direction of the magnetic field, said magnetic field changing when a relative rotation occurs between the magnetic sensor and the first and second magnets;

the yoke is constructed from at least one plate material that is processed to have the tubular form;

at least one contact portion, at each of which a corresponding circumferential end part of the at least one plate material and another corresponding circumferential end part of the at least one plate material contact with each other, is placed radially outward of at least one of the first magnet and the second magnet;

the yoke has a first inner diameter that is measured in the first direction;

the yoke has a second inner diameter that is measured in a second direction that is perpendicular to both of the first direction and the central axis of the yoke;

the second inner diameter of the yoke is larger than the first inner diameter of the yoke;

a radius of curvature of a radially outer side wall of the first magnet is larger than a radius of curvature of the first section of the inner peripheral wall of the yoke; and a radius of curvature of a radially outer side wall of the second magnet is larger than a radius of curvature of the second section of the inner peripheral wall of the yoke.

2. The rotational angle sensing device according to claim 1, wherein:

opposed outer walls of the first magnet, which are opposed to each other in the second direction, are generally perpendicular to the second direction; and opposed outer walls of the second magnet, which are opposed to each other in the second direction, are generally perpendicular to the second direction.

3. The rotational angle sensing device according to claim 1, wherein the at least one contact portion includes at least one of:

a first contact portion that is placed adjacent to a center of the first magnet, which is centered in the second direction; and a second contact portion that is placed adjacent to a center of the second magnet, which is centered in the second direction.

* * * * *